US012119679B1

United States Patent
Wang (10) Patent No.: US 12,119,679 B1
(45) Date of Patent: Oct. 15, 2024

(54) WIRELESS CHARGING DEVICE WITH STABLE CONNECTION AND CHARGING METHOD THEREOF

(71) Applicant: Shenzhen Yibai Internet Co., Ltd., Shenzhen (CN)

(72) Inventor: Jingxin Wang, Guangdong (CN)

(*) Notice: Subject to any disclaimer, the term of this patent is extended or adjusted under 35 U.S.C. 154(b) by 0 days.

(21) Appl. No.: 18/593,949

(22) Filed: Mar. 3, 2024

(51) Int. Cl.
*H01M 10/44* (2006.01)
*H01M 10/46* (2006.01)
*H02J 7/00* (2006.01)
*H02J 50/12* (2016.01)
*H02J 50/90* (2016.01)

(52) U.S. Cl.
CPC ............ *H02J 50/90* (2016.02); *H02J 7/0042* (2013.01); *H02J 50/12* (2016.02)

(58) Field of Classification Search
CPC ........ H02J 7/0042; H02J 50/005; H02J 50/12; H02J 50/90
USPC ................................ 320/107, 108, 114, 115
See application file for complete search history.

(56) References Cited

U.S. PATENT DOCUMENTS

2017/0302098 A1* 10/2017 Miller ...................... H02J 7/342
2022/0224156 A1* 7/2022 Silva ...................... H02J 7/0042

FOREIGN PATENT DOCUMENTS

| CN | 112087022 A | * | 12/2020 | ............ H02J 7/0044 |
| CN | 216056426 U | * | 3/2022 | |
| CN | 216530637 U | * | 5/2022 | |
| CN | 217642877 U | * | 10/2022 | |
| CN | 220172931 U | * | 12/2023 | |

* cited by examiner

*Primary Examiner* — Edward Tso
(74) *Attorney, Agent, or Firm* — Hawaii Patent Services; Nathaniel K. Fedde; Kenton N. Fedde (57) ABSTRACT

A wireless charging device with a stable connection and a charging method thereof. The wireless charging device has a wireless charging device; the wireless charging device has a wireless charger and a magnetic attraction device, wherein the wireless charger has a charging end face, and the magnetic attraction device has a magnetic attraction part and an adsorption disk, the magnetic attraction part is arranged on the charging end face, and the adsorption disk is adsorbed by the magnetic attraction part to form a detachable connection; wherein the adsorption disk is fixedly connected to an electronic product, and the electronic product has a protective sleeve; the charging steps are as follows: putting the electronic product to be charged into the protective sleeve; fixing the adsorption disk on the protective sleeve; adsorbing the electronic product to the wireless charger.

20 Claims, 11 Drawing Sheets

WIRELESS CHARGING DEVICE WITH STABLE CONNECTION AND CHARGING METHOD THEREOF

TECHNICAL FIELD

The present invention relates to the technical field of charging devices, in particular to a wireless charging device with a stable connection and a charging method thereof.

BACKGROUND

A wireless charger is a device that uses the principle of near-field induction or magnetic resonance to transmit electric energy from the transmitter to the receiver, so as to realize the wireless connection between electrical appliances and power supply. The existing wireless charger and electronic equipment are usually connected by magnetic attraction.

However, the connection between electronic equipment and wireless charger is not stable, and it is easy to cause dislocation due to movement or collision, and people often put protective shells on electronic equipment, which further affects stability. For example, a wireless charger disclosed in U.S. Pat. No. 17,095,771 has the problem that the connection between electronic equipment and the wireless charger is unstable; similarly, a wireless charger disclosed in U.S. Pat. No. 18,347,831 also has the problem of easy dislocation between the electronic equipment and the wireless charger.

Therefore, it is necessary for us to propose a new type of wireless charging device. The connection between the wireless charging device and electronic equipment is stable, and dislocation will not be caused by movement or collision, which can provide users with a more stable and worry-free choice of wireless charging devices.

SUMMARY

The present invention provides a wireless charging device with a stable connection, which includes:
a wireless charging device;
wherein the wireless charging device comprises a wireless charger and a magnetic attraction device, wherein the wireless charger comprises a charging end face, and the magnetic attraction device comprises a magnetic attraction part and an adsorption disk, wherein the magnetic attraction part is arranged on the charging end face, and the adsorption disk is adsorbed by the magnetic attraction part to form a detachable connection; and
wherein, the magnetic attraction part is provided with at least one magnetic attraction groove, the adsorption disk is provided with at least one adsorption protrusion, and the adsorption protrusion is embedded in the magnetic attraction groove.

The present invention provides a wireless charging device with a stable connection, which includes:
a wireless charging device;
wherein the wireless charging device comprises a wireless charger and a magnetic attraction device, wherein the wireless charger comprises a charging end face, and the magnetic attraction device comprises a magnetic attraction part and an adsorption disk; the magnetic attraction part is arranged on the charging end face, and the adsorption disk is adsorbed by the magnetic attraction part to form a detachable connection; and
wherein, the magnetic attraction part is provided with at least one magnetic attraction groove, the adsorption disk is provided with at least one adsorption protrusion, and the adsorption protrusion is embedded in the magnetic attraction groove; and
wherein, the adsorption disk is fixedly connected to an electronic product, and the electronic product comprises a protective sleeve; the adsorption disk is fixedly connected to the protective sleeve, and the protective sleeve is detachably connected with the wireless charger by the magnetic attraction device.

The present invention also provides a method for wirelessly charging an electronic product, which includes the following steps:
providing an electronic product and a wireless charging device with a stable connection, wherein the wireless charging device comprises a wireless charging device; and
wherein the wireless charging device comprises a wireless charger and a magnetic attraction device, wherein the wireless charger comprises a charging end face, and the magnetic attraction device comprises a magnetic attraction part and an adsorption disk; the magnetic attraction part is arranged on the charging end face, and the adsorption disk is adsorbed by the magnetic attraction part to form a detachable connection; and
wherein, the magnetic attraction part is provided with at least one magnetic attraction groove, the adsorption disk is provided with at least one adsorption protrusion, and the adsorption protrusion is embedded in the magnetic attraction groove; and
wherein, the adsorption disk is fixedly connected to an electronic product, and the electronic product comprises a protective sleeve; the adsorption disk is fixedly connected to the protective sleeve, and the protective sleeve is detachably connected with the wireless charger by the magnetic attraction device; and
the charging step is as follows:
putting the electronic product into the protective sleeve;
fixing the adsorption disk to the protective sleeve; and
adsorbing the electronic product to the wireless charger.

BRIEF DESCRIPTION OF DRAWINGS

In order to explain the technical solution of this application more clearly, the drawings needed in the implementation will be briefly introduced below. Obviously, the drawings described below are only some implementations of this application. For those skilled in the art, other drawings can be obtained according to these drawings without creative work.

In the figures.

Wireless charging device (1000); Wireless charger (2000); Charging end face (2001); Charger body (2002); Charging chamber (2003); Power cord (2004); Charging module (2005); Upper cover plate (2006); Magnetic attraction device (3000); Magnetic attraction part (3001); Adsorption disk (3002); Magnetic suction groove (3003); Adsorption protrusion (3004); Protective sleeve (5000); Electronic product (6000).

DESCRIPTION OF EMBODIMENTS

In the following, the technical solution in the embodiment of the application will be clearly and completely described with reference to the drawings in the embodiment of the application. Obviously, the described embodiment is only a part of the embodiment of the application, but not the whole embodiment. Based on the embodiments in this application, all other embodiments obtained by those skilled in the art without creative labor belong to the protection scope of this application.

Reference to "an example" or "an embodiment" herein means that a particular feature, structure or characteristic described in connection with an embodiment or an embodiment can be included in at least one embodiment of this application. The appearance of this phrase in various places in the specification does not necessarily refer to the same embodiment, nor is it an independent or alternative embodiment mutually exclusive with other embodiments. It is understood explicitly and implicitly by those skilled in the art that the embodiments described herein can be combined with other embodiments.

In this specification, for the sake of convenience, words and expressions indicating orientation or positional relationship such as "middle", "upper", "lower", "front", "rear", "vertical", "horizontal", "top", "inner" and "outer" are used to illustrate the positional relationship of constituent elements with reference to the attached drawings, only for the convenience of description. The positional relationship of the constituent elements is appropriately changed according to the direction of the described constituent elements. Therefore, it is not limited to the words and expressions described in the specification, and can be replaced appropriately according to the situation.

As shown in FIGS. 1 to 11, the present invention provides a wireless charging device 1000 with a stable connection, including a wireless charging device 1000;

the wireless charging device 1000 includes a wireless charger 2000 and a magnetic attraction device 3000, and the wireless charger 2000 and the magnetic attraction device 3000 are detachably connected by magnetic force, thereby improving the convenience and safety of wireless charging. The wireless charger 2000 includes a charging end face 2001, which is used to transmit electric energy to the charged device. The magnetic attraction device 3000 comprises a magnetic attraction part 3001 and an adsorption disk 3002, wherein the magnetic attraction part 3001 is arranged on the charging end surface 2001, and the adsorption disk 3002 is absorbed by the magnetic attraction part 3001 to form a detachable connection.

The adsorption disk 3002 is fixedly connected to an electronic product 6000, and the electronic product 6000 includes a protective sleeve 5000. The adsorption disk 3002 is fixedly connected to the protective sleeve 5000, and the protective sleeve 5000 is detachably connected with the wireless charger 2000 by the magnetic attraction device 3000.

Figure 1:
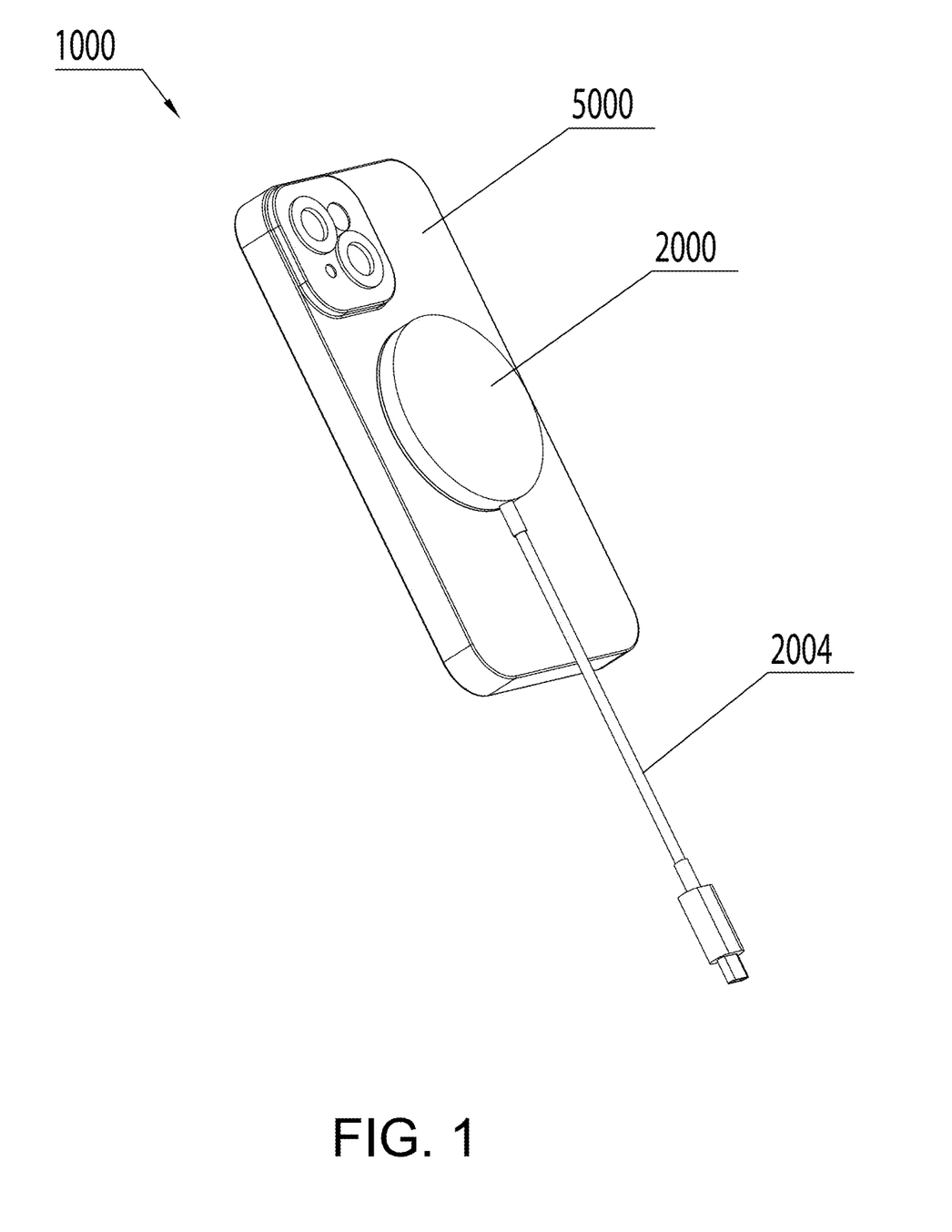
FIG. 1 is a schematic diagram of a wireless charging device.
Figure 2:
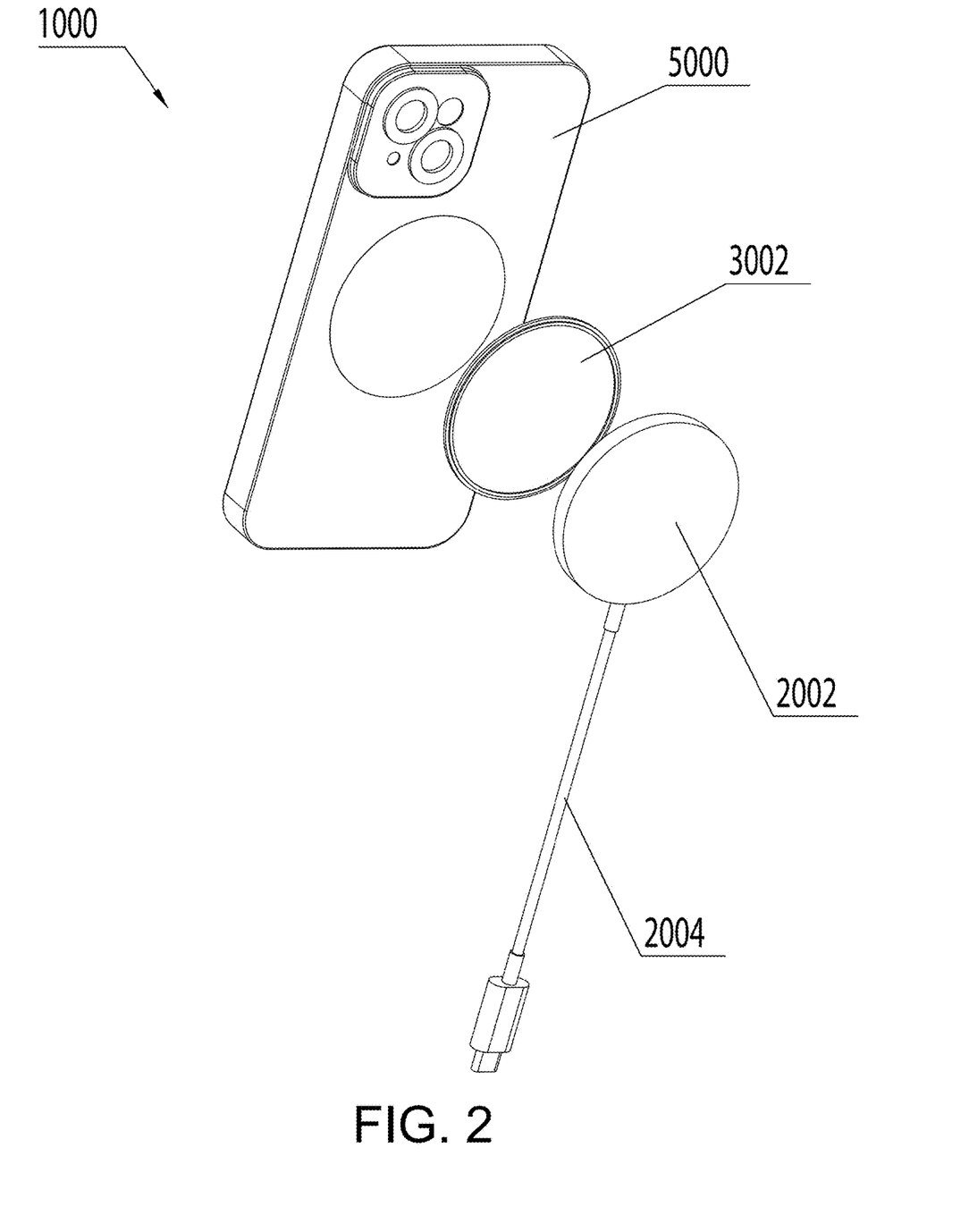
FIG. 2 is an exploded view of FIG. 1.
Figure 3:
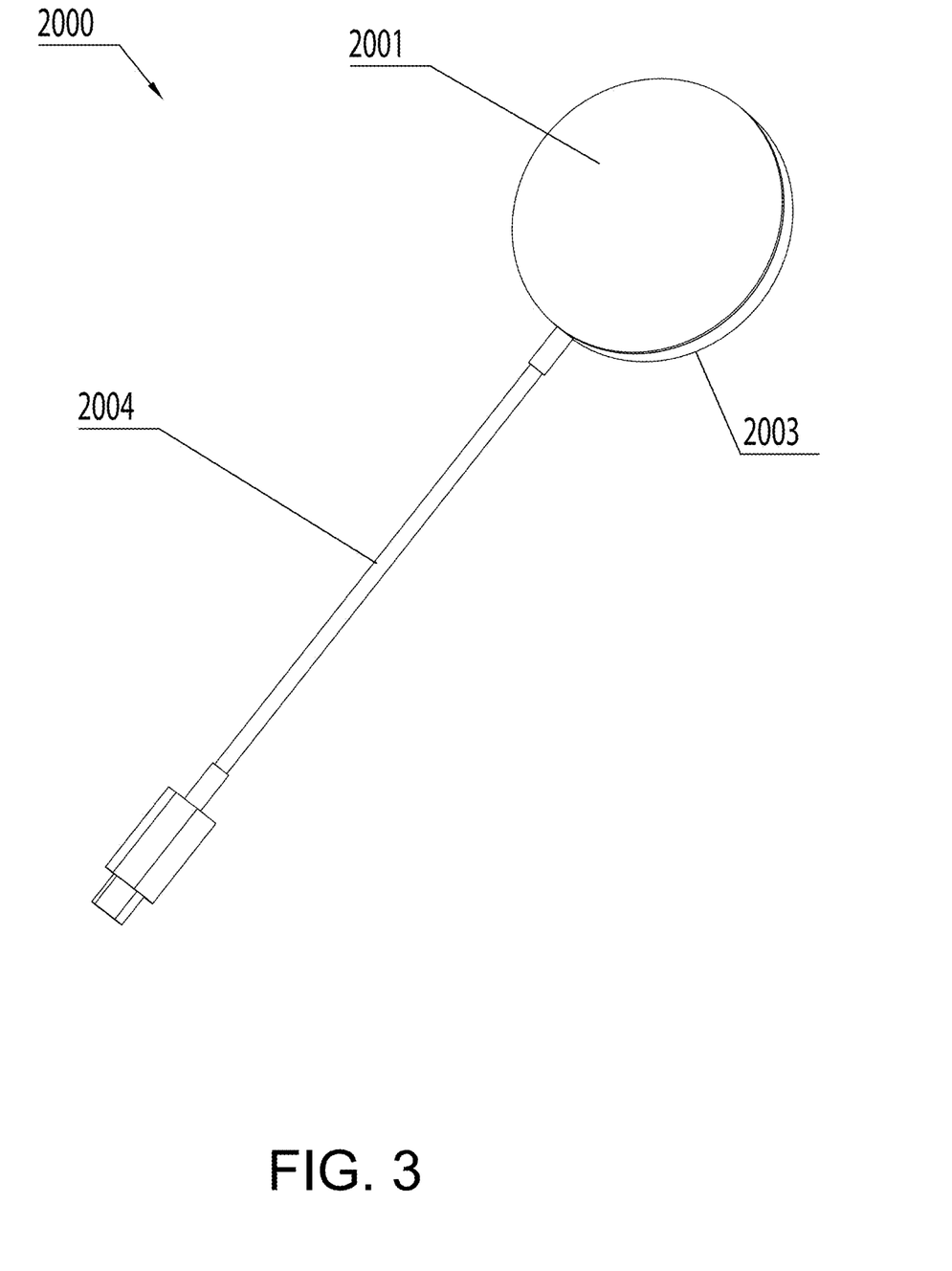
FIG. 3 is a schematic diagram of a wireless charger.
Figure 4:
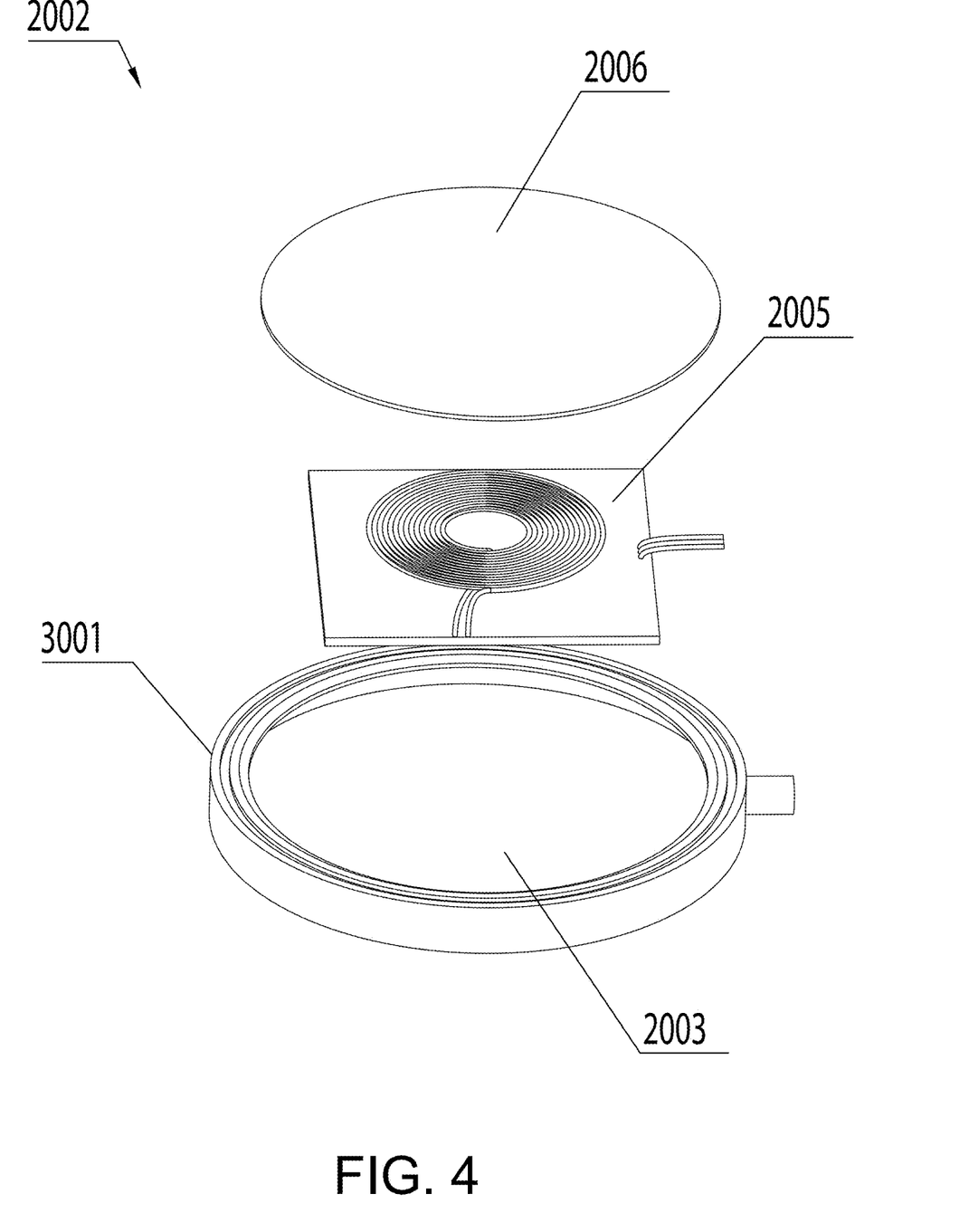
FIG. 4 is an exploded view of the charger body.
Figure 5:
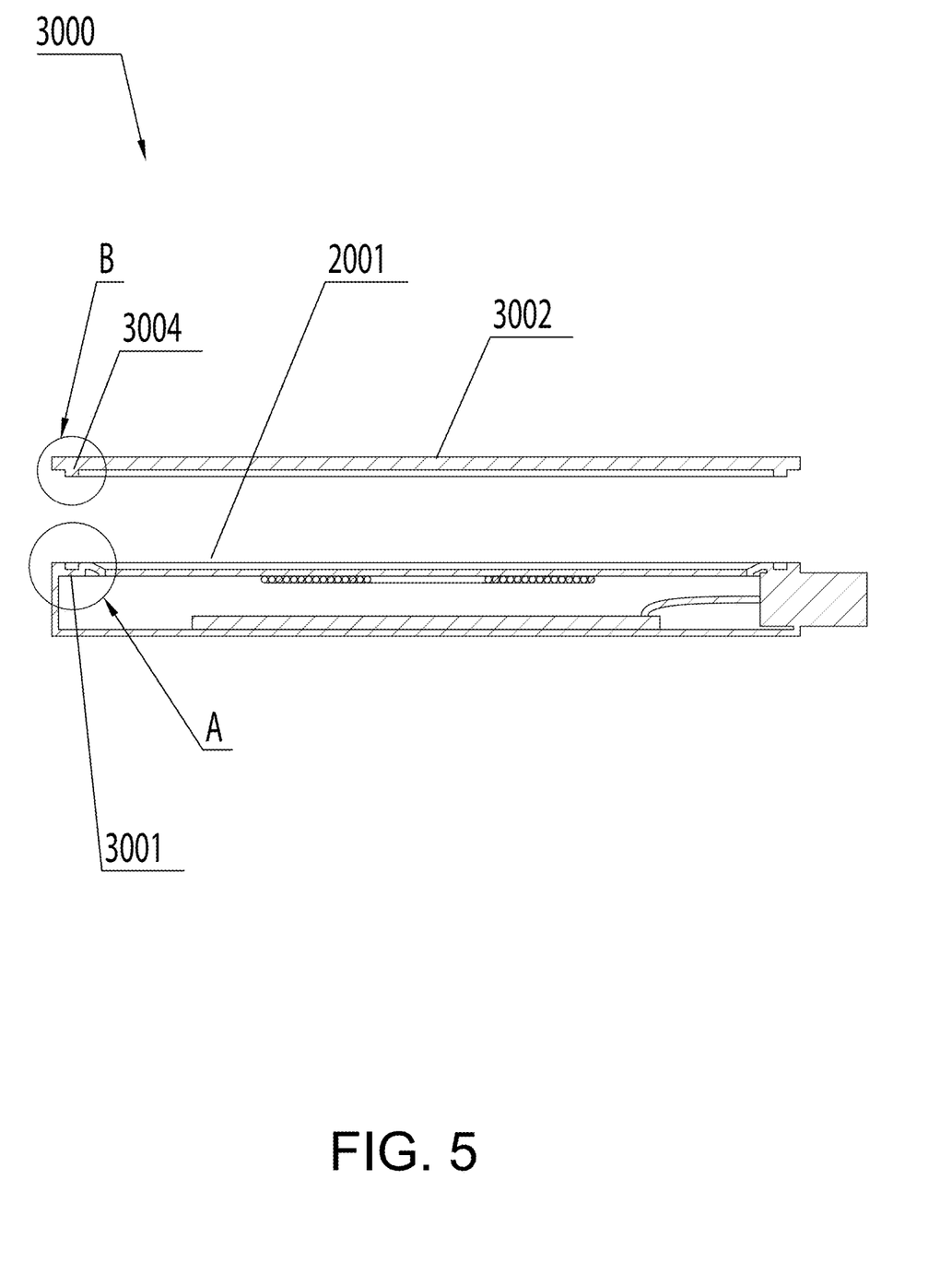
FIG. 5 is a sectional view of the magnetic attraction device.
Figure 6:
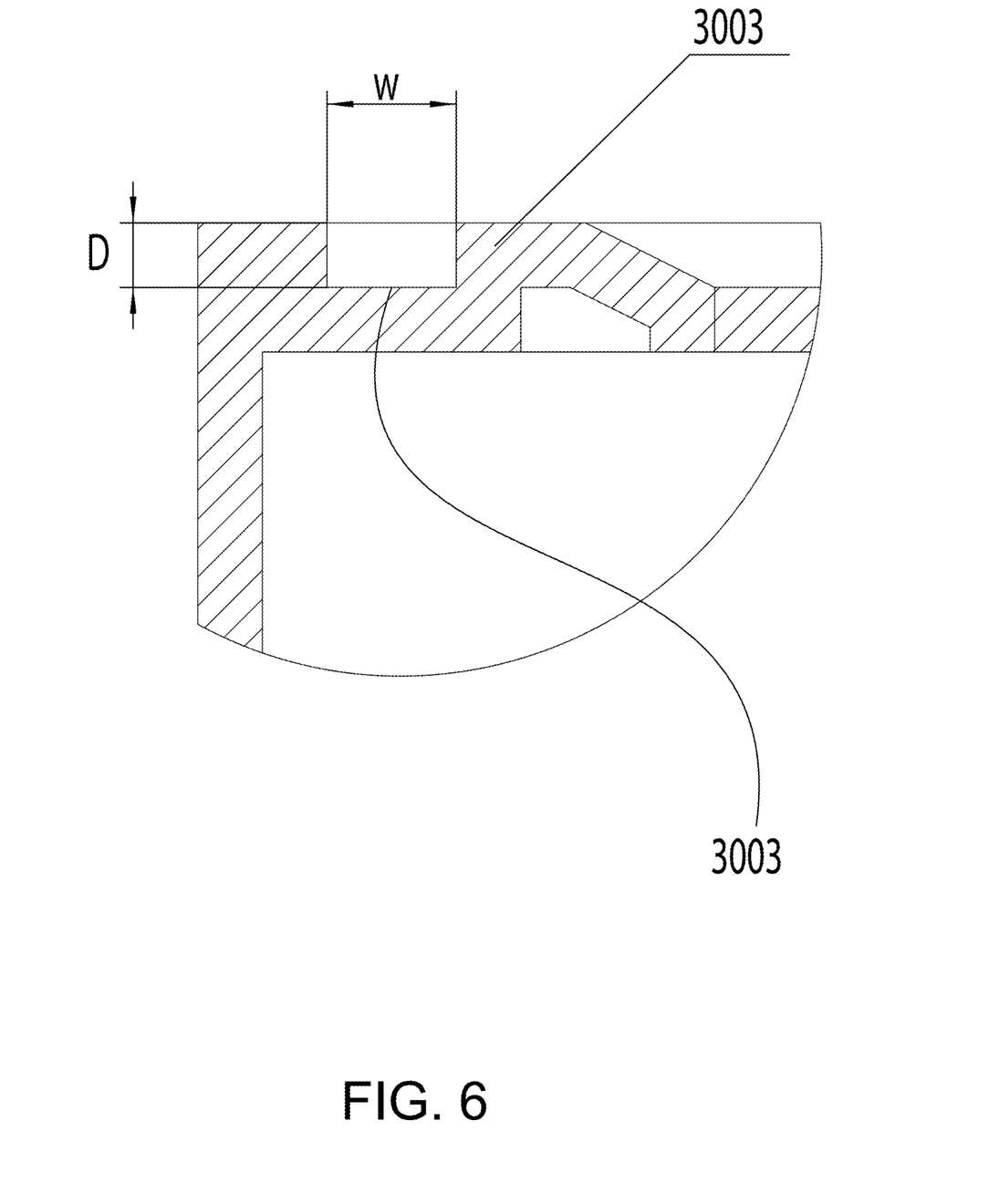
FIG. 6 is a schematic view at A in FIG. 5.
Figure 7:
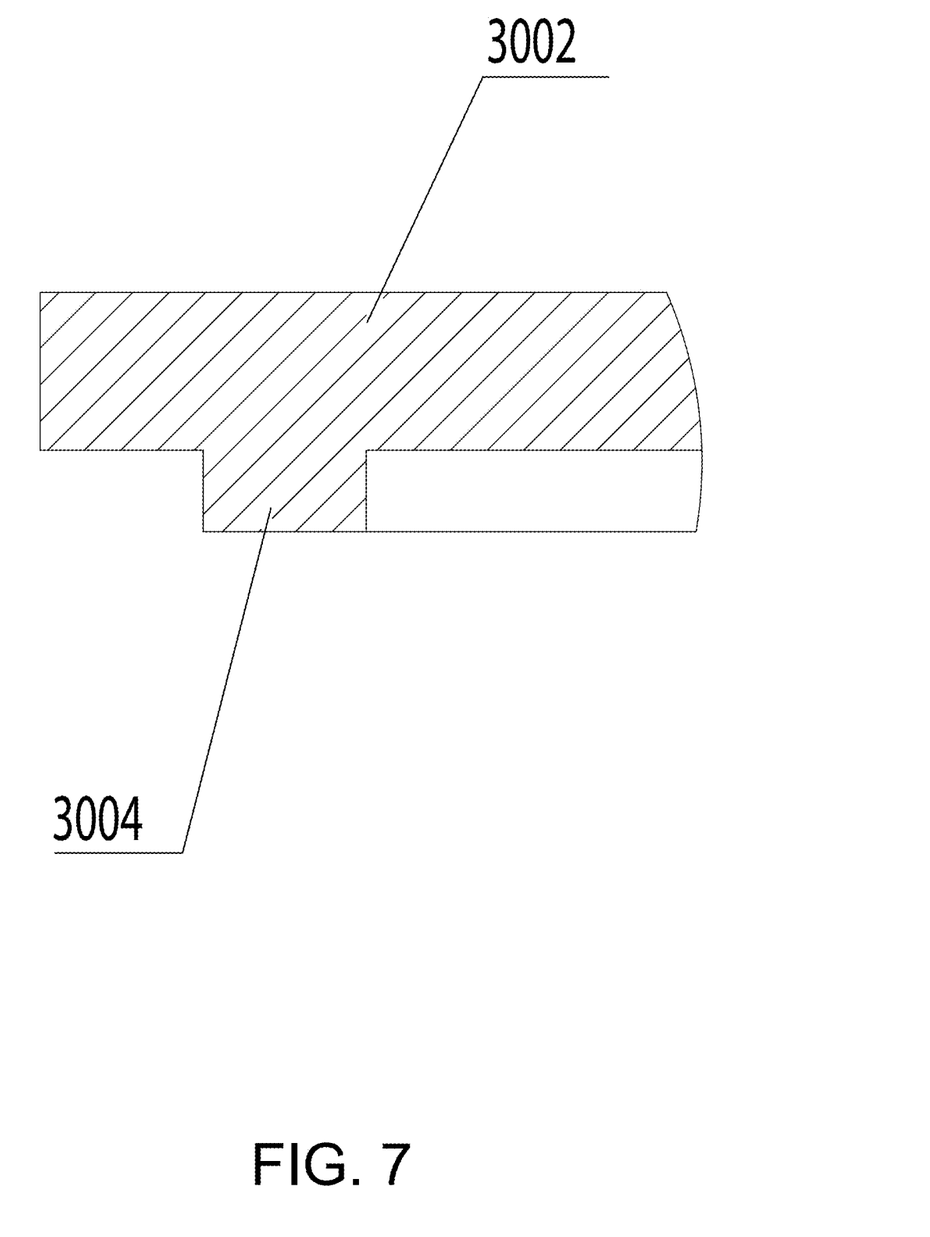
FIG. 7 is a schematic view at B in FIG. 5.

In this embodiment, the magnetic attraction part 3001 is provided with at least one magnetic attraction groove 3003, and the adsorption disk 3002 is provided with at least one adsorption protrusion 3004 corresponding to the magnetic attraction groove 3003, thereby enhancing the magnetic attraction. In some embodiments, the magnetic attraction part is not provided with a magnetic attraction groove, and the adsorption disk is not provided with an adsorption protrusion. In some embodiments, a protrusion can be provided at the magnetic attraction part, and a groove can be provided at the adsorption disk.

Figure 8:
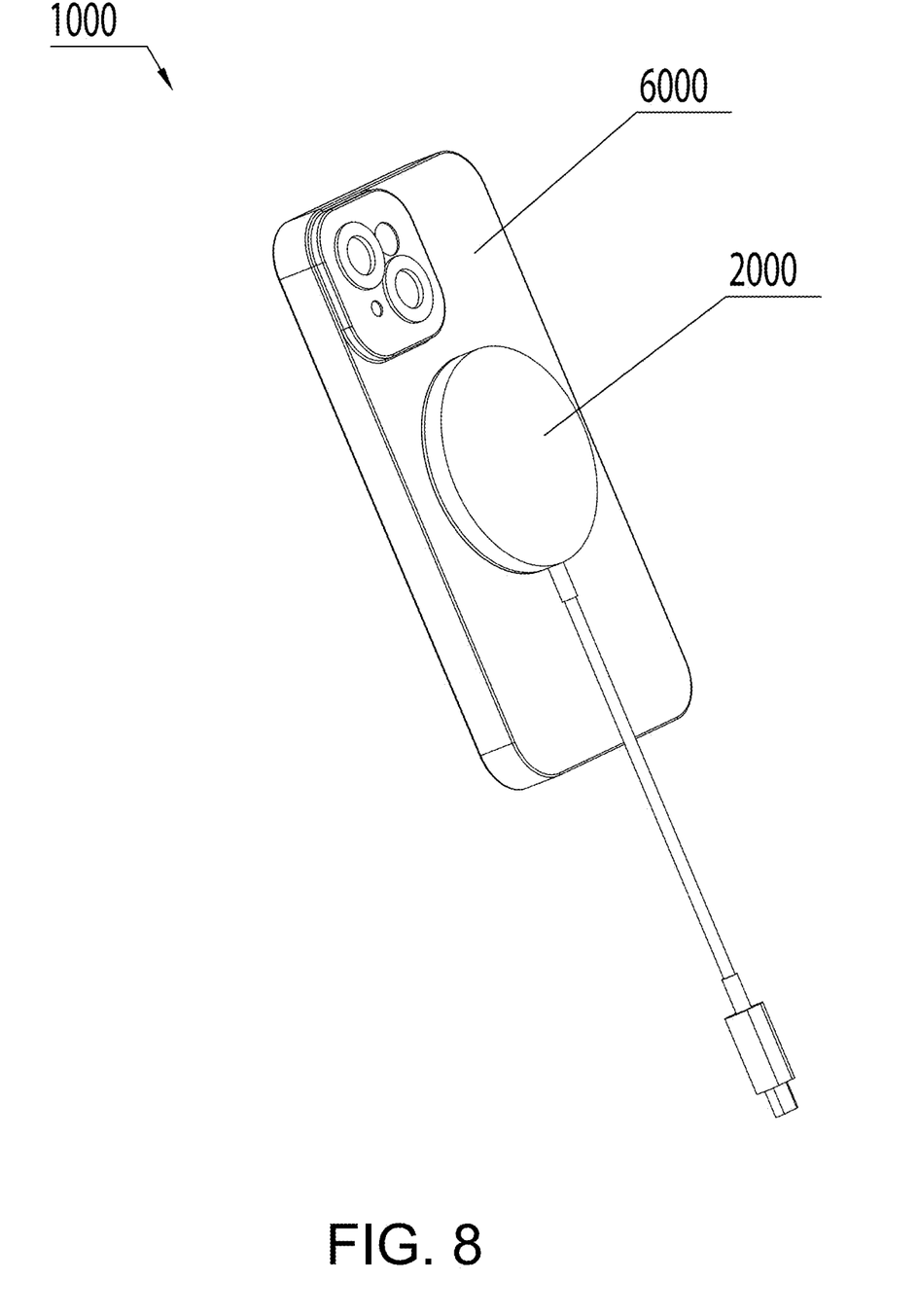
FIG. 8 is a schematic diagram of another embodiment 1 of FIG. 1.
Figure 9:
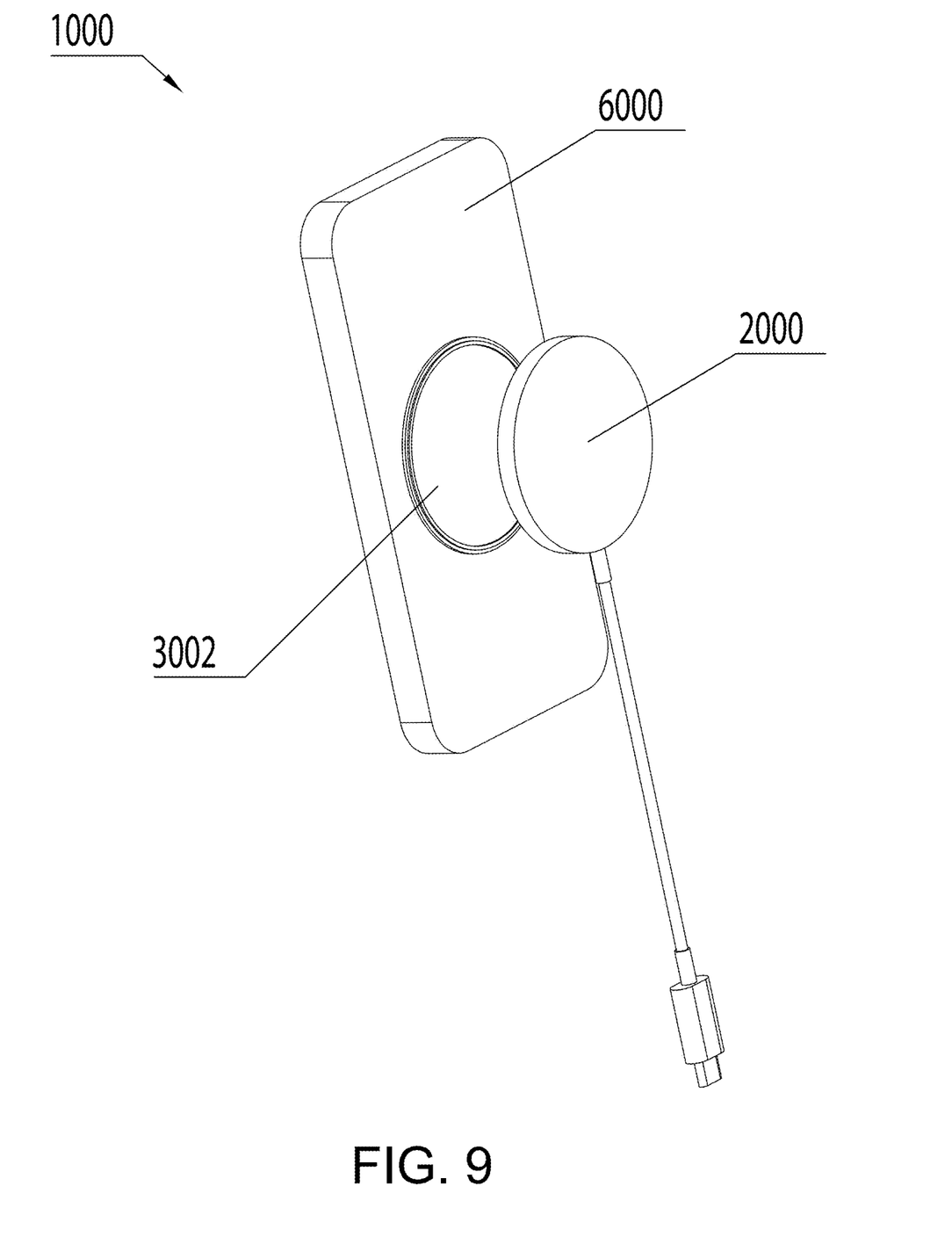
FIG. 9 is a partial exploded view of FIG. 8.

As shown in FIGS. 8 to 9, in another embodiment, the adsorption disk 3002 can be directly and fixedly connected to the electronic product 6000. In some embodiments, the adsorption disk is not limited to being provided on the electronic product, but also can be arranged in the protective shell of the electronic product, the supporting seat of the electronic product and any desired position thereof.

Figure 10:
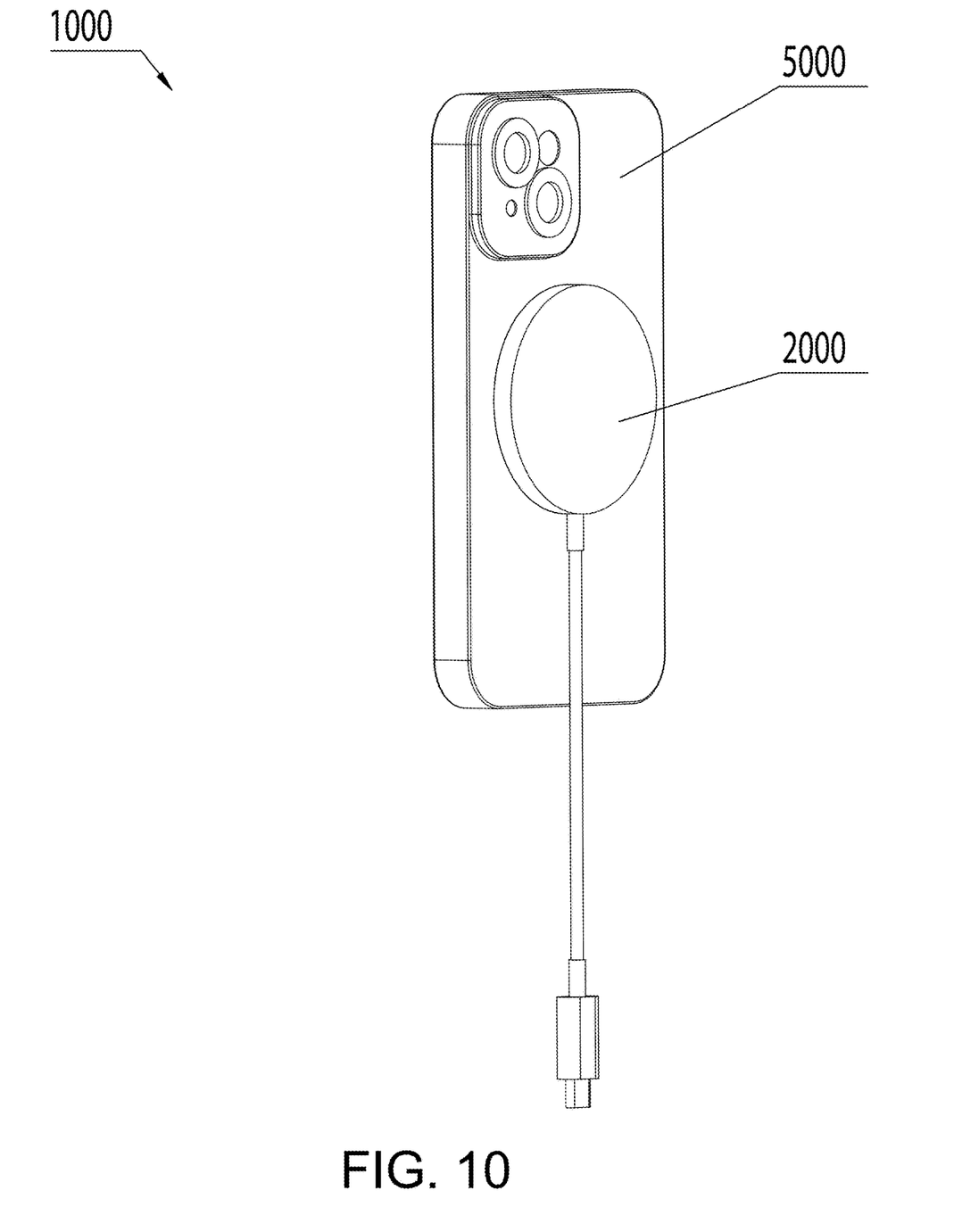
FIG. 10 is a schematic diagram of another embodiment 2 of FIG. 1.
Figure 11:
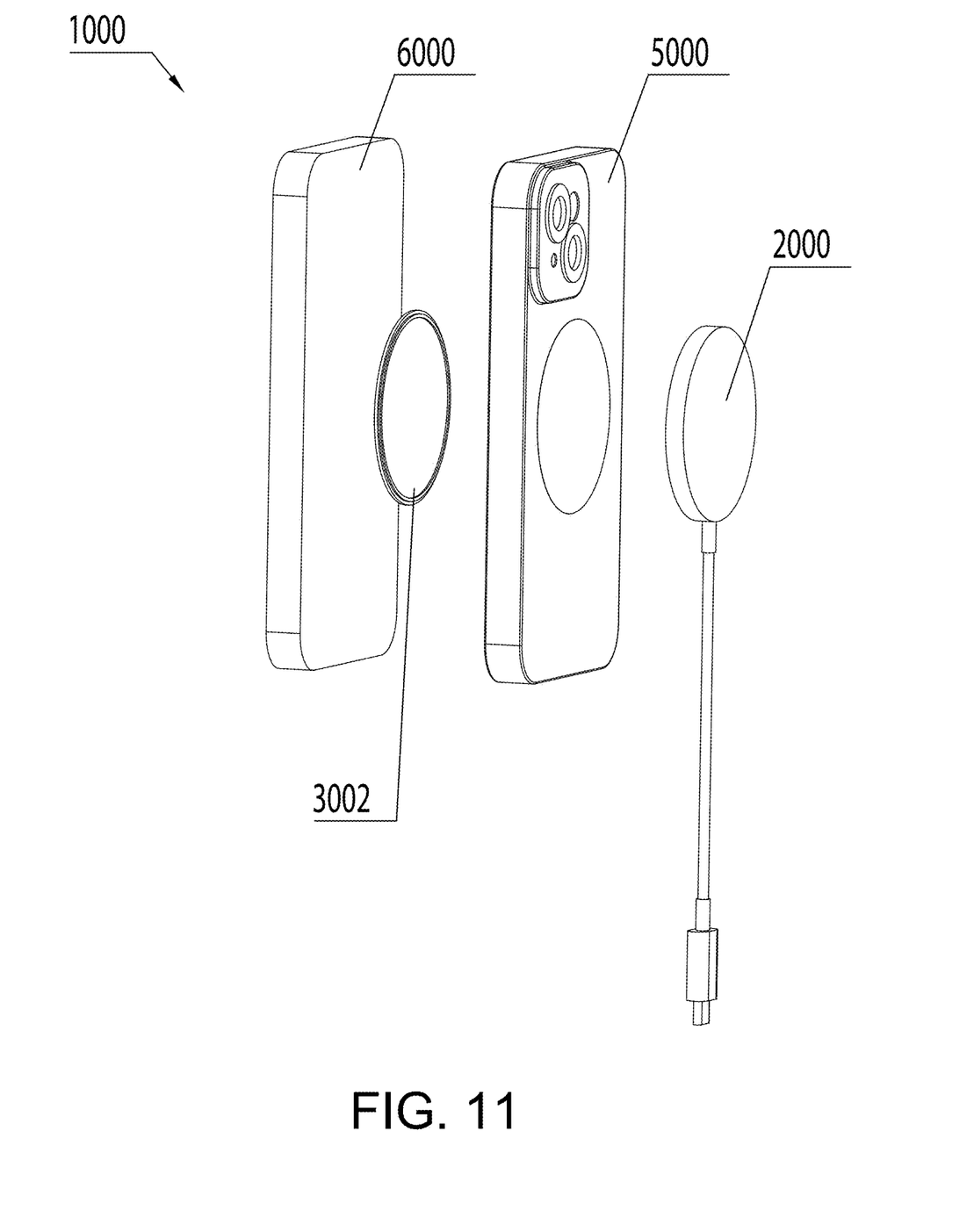
FIG. 11 is a partial exploded view of FIG. 10.

As shown in FIG. 10, in another embodiment, the adsorption disk 3002 can also be arranged between the electronic product 6000 and the protective sleeve 5000; wherein, the adsorption disk 3002 is fixedly connected to the electronic product 6000, and the protective sleeve 5000 is sleeved on the electronic product 6000 and the adsorption disk 3002, and the electronic product 6000 is connected with the wireless charger 2000 through the protective sleeve 5000 and the adsorption disk 3002. In some embodiments, the protective sleeve is provided with a groove corresponding to the adsorption disk, which can make the protective sleeve more suitable for the adsorption disk.

In this embodiment, the connection mode of the wireless charging device 1000 is firm and reliable, and it is not easy to fall off, and it can maintain a stable charging effect even in the case of movement or vibration, thus improving the charging efficiency and safety. In addition, the connection mode is flexible and diverse, and different magnetic components and adsorption disks can be selected according to different scenes and needs to realize different charging postures and angles, which increases the comfort and convenience of charging.

In this embodiment, the wireless charging device can be designed with different magnetic attraction devices and protective covers according to different equipment types and sizes, so as to adapt to different wireless charging requirements and scenarios. For example, wireless charging devices suitable for different devices such as mobile phones, tablets and notebooks can be designed, and wireless charging devices suitable for different environments such as homes, offices and automobiles may also be designed.

In some embodiments, an induction coil is added to the magnetic attraction part and the adsorption disk to realize the bidirectional wireless charging function, that is, the wireless charger can charge the charged equipment or obtain electric energy from the charged equipment, so as to realize the exchange and sharing of electric energy and increase the utilization rate and economy of electric energy.

In some embodiments, sensors and displays are added to the magnetic attraction part and the adsorption disk to realize the intelligence and visualization of wireless charging, that is, the wireless charger can sense the electric quantity and charging state of the charged equipment and display it to the user through the display, which is convenient for the user to master the charging information, optimize the charging strategy and improve the charging quality and satisfaction.

In some embodiments, a communication module and a control module are added to the magnetic attraction part and the adsorption disk to realize the remote and automation of wireless charging, that is, the wireless charger can exchange data and command control with the charged equipment through the wireless network, and automatically adjust the charging parameters and modes according to the preset conditions and rules, so as to adapt to different charging environments and demands and improve the intelligence and flexibility of charging.

In this embodiment, the adsorption disk 3002 is fixedly connected with the protective sleeve 5000 by adhesive connection. Specifically, the adhesive is pasted on the adsorption disk, and then the other end of the adhesive is attached to the protective sleeve, so that the adsorption disk and the protective sleeve are fixedly connected.

In other embodiments (not shown in the figure), the adsorption disk and the protective sleeve are not limited to being fixedly connected by adhesive connection, but also can be integrally formed, connected by hook and loop, connected by snap, connected by screws, welded and any other desired connection mode.

As shown in FIGS. 1 to 4, in this embodiment, the wireless charger 2000 includes a charger body 2002, which includes a charging chamber 2003 and a power cord 2004; a charging module 2005 is arranged in the charging chamber 2003, and the charging module 2005 is electrically connected with the power cord 2004. Wherein, the charging module can convert the alternating current input by the power cord into direct current, and stabilize and filter the direct current, thus outputting stable direct current.

In some embodiments, different wireless charging devices and charging modules may be designed for the wireless charger according to different equipment types and powers to adapt to different charging requirements and parameters. For example, it can be configured as a wireless charging device suitable for different devices such as mobile phones, tablets and notebooks, and it can also be configured as a charging module suitable for different voltages such as 5V, 9V and 12V.

In some embodiments, some additional functions are added to the wireless charging device and charging module of the wireless charger adds to increase the intelligence and controllability of charging. For example, some indicator lights or display screens are added to the wireless charging device to show the charging status and progress; some protection circuits or switches can also be added to the charging module to realize the protection of over-current, over-voltage and over-temperature of charging, or to realize the control of starting, closing and pausing of charging.

In some embodiments, the wireless charger can be linked with other intelligent devices or systems to realize remote and automatic charging. For example, the wireless charger can interact and control data with mobile phones, computers, smart homes and other devices or systems through wireless networks or Bluetooth. The wireless charger can also identify the user's identity and intention through voice, gesture and facial recognition, so as to realize the convenience and intelligence of charging.

As shown in FIGS. 2 to 5, in this embodiment, the charging chamber 2003 includes a charging end face 2001, which includes a magnetic attraction part 3001 and an upper cover plate 2006. The upper cover plate 2006 is fixedly connected to the charging chamber 2003, which covers the charging module 2005, and the magnetic attraction part 3001 is arranged on the charging end face 2001, and the magnetic attraction part 3001 is arranged on the outer periphery of the upper cover plate 2006. Wherein, the upper cover plate can protect the charging module and prevent the charging module from being damaged or polluted by the outside.

In this embodiment, the wireless charger 2000 and the adsorption disk 3002 are provided in a substantially circular shape. In other embodiments (not shown in the figure), the wireless charger and the adsorption disk are not limited to being roughly circular, but can also be set into polygons, squares, triangles, ellipses, semicircles, pentagrams and any desired geometric shapes.

As shown in FIG. 6, in this embodiment, the magnetic attraction part 3001 is provided with a magnetic attraction groove 3003, and the magnetic attraction part 3001 is provided as a magnet, wherein the depth D of the magnetic attraction groove 3003 is 0.5 mm≤D≤2.5 mm, and the width W is 0.5 mm≤W≤2 mm. Specifically, the magnetic suction groove can be set as Sm—Co magnet, Nd—Fe—B magnet, ferrite magnet, Al—Ni—Co magnet, Fe—Cr—Co magnet, electromagnet and any magnetic substance that meets the wishes.

As shown in FIG. 6, in this embodiment, the magnetic suction groove 3003 is generally annular in shape and has a substantially U-shaped cross section. In other embodiments (not shown in the figure), the magnetic attraction groove is not limited to being generally annular and having a generally U-shaped cross section as a whole, but can also be circular, polygonal, square, triangular, elliptical, semi-circular, pentagonal and any desired geometric shape.

In this embodiment, the depth D of the magnetic suction groove 3003 is 5 mm≤D≤2.5 mm. In other embodiments (not shown in the figure), the range of the depth D of the magnetic attraction groove is not limited to 0.5 mm≤D≤2.5 mm, but can also be set to 0.2 mm≤D≤1.2 mm, 0.9 mm≤D≤3.5 mm, 2.5 mm≤D≤5.5 mm and any desired value range.

In this embodiment, the width W of the magnetic suction groove 3003 is 0.5 mm≤W≤2 mm. In other embodiments (not shown in the figure), the range of width W is not limited to 0.5 mm≤W≤2 mm, but can also be set to 0.1 mm≤W≤1.5 mm, 0.8 mm≤W≤2.8 mm, 1.5 mm≤W≤3 mm and any arbitrary value range.

As shown in FIG. 7, in this embodiment, at least one adsorption protrusion 3004 is arranged on the adsorption disk 3002, and the adsorption protrusion 3004 is provided as an iron sheet. Wherein, the adsorption protrusion 3004 is arranged in a shape that can be embedded in the magnetic suction groove 3003, and the adsorption protrusion 3004 can be made of a ferromagnetic material, a paramagnetic material and any desired material.

In this embodiment, the adsorption disk 3002 has a substantially T-shaped cross section. In other embodiments (not shown in the figure), the adsorption disk is not limited to having a substantially T-shaped cross section, but can also be set to be circular, polygonal, square, triangular, elliptical, semicircular, pentagonal and any desired geometric shape.

The present invention also provides a method for wirelessly charging an electronic product, which comprises the following steps:

providing an electronic product and a wireless charging device with a stable connection, wherein the wireless charging device comprises a wireless charging device; and wherein the wireless charging device comprises a wireless charger and a magnetic attraction device, wherein the wireless charger comprises a charging end face, and the magnetic attraction device comprises a magnetic attraction part and an adsorption disk; the magnetic attraction part is arranged on the charging end face, and the adsorption disk is adsorbed by the magnetic attraction part to form a detachable connection; and wherein, the magnetic attraction part is provided with at least one magnetic attraction groove, the adsorption disk is provided with at least one adsorption protrusion, and the adsorption protrusion is embedded in the magnetic attraction groove; and wherein, the adsorption disk is fixedly connected to an electronic product, and the electronic product comprises a protective sleeve; the adsorption disk is fixedly connected to the protective sleeve, and the protective sleeve is detachably connected with the wireless charger by the magnetic attraction device; and the charging step is as follows:
putting the electronic product into the protective sleeve;
fixing the adsorption disk to the protective sleeve; and
adsorbing the electronic product to the wireless charger.

Wherein, when preparing the protective cover, it is necessary to prepare the protective cover suitable for the electronic product.

Wherein, when the adsorption disk is fixed to the protective sleeve, the adsorption disk should be fixed to the corresponding charging part of the protective sleeve.

Wherein, when electronic products are adsorbed to the wireless charger, it is necessary to embed the adsorption protrusions on the adsorption disk into the magnetic absorption groove on the magnetic absorption part.

In another embodiment, the charging step is as follows: fixing the adsorption disk to the electronic product; and adsorbing the electronic products to the wireless charger.

In another embodiment, the charging step is as follows: fixing the adsorption disk to the electronic product; putting the electronic product into the protective sleeve; and adsorbing the electronic product to the wireless charger.

The technical means disclosed in the solution of the present invention are not limited to the technical means disclosed in the above embodiments, but also include the technical solution composed of any combination of the above technical features. It should be pointed out that for those skilled in the art, several improvements and embellishments can be made without departing from the principle of the present invention, and these improvements and embellishments are also regarded as the protection scope of the present invention.

What is claimed is:

1. A wireless charging device with a stable connection, comprising:
    wherein said wireless charging device comprises a wireless charger and a magnetic attraction device, wherein said wireless charger comprises a charging end face, and said magnetic attraction device comprises a magnetic attraction part and an adsorption disk, wherein said magnetic attraction part is arranged on said charging end face, and said adsorption disk is adsorbed by said magnetic attraction part to form a detachable connection; and
    wherein, said magnetic attraction part is provided with at least one magnetic attraction groove, said adsorption disk is provided with at least one adsorption protrusion, and said at least one adsorption protrusion is embedded in said at least one magnetic attraction groove.

2. The wireless charging device with a stable connection according to claim 1, wherein said adsorption disk is fixedly connected to an electronic product.

3. The wireless charging device with a stable connection according to claim 2, wherein said electronic product comprises a protective sleeve, said adsorption disk is fixedly connected to said protective sleeve, and said protective sleeve is detachably connected with said wireless charger by said magnetic attraction device.

4. The wireless charging device with a stable connection according to claim 1, wherein said wireless charger comprises a charger body which comprises a charging chamber and a power cord; a charging module is arranged in said charging chamber, and said charging module is electrically connected with said power cord.

5. The wireless charging device with a stable connection according to claim 4, wherein said charging chamber comprises said charging end face, which comprises said magnetic attraction part and an upper cover plate; said upper cover plate is fixedly connected to said charging chamber, and said upper cover plate covers said charging module, and said magnetic attraction part is arranged on said charging end face, and said magnetic attraction part is arranged on a periphery of said upper cover plate.

6. The wireless charging device with a stable connection according to claim 5, wherein said magnetic attraction part is provided with said at least one magnetic attraction groove, and said at least one magnetic attraction groove is provided in a substantially annular shape and has a substantially U-shaped cross section.

7. The wireless charging device with a stable connection according to claim 6, wherein said wireless charger and said adsorption disk are provided in a substantially circular shape.

8. The wireless charging device with a stable connection according to claim 7, wherein said adsorption disk has a substantially T-shaped cross section.

9. A wireless charging device with a stable connection, comprising:
    wherein said wireless charging device comprises a wireless charger and a magnetic attraction device, wherein said wireless charger comprises a charging end face, and said magnetic attraction device comprises a magnetic attraction part and an adsorption disk; said magnetic attraction part is arranged on said charging end face, and said adsorption disk is adsorbed by said magnetic attraction part to form a detachable connection; and
    wherein, said magnetic attraction part is provided with at least one magnetic attraction groove, said adsorption disk is provided with at least one adsorption protrusion, and said at least one adsorption protrusion is embedded in said at least one magnetic attraction groove; and
    wherein, said adsorption disk is fixedly connected to an electronic product, and said electronic product comprises a protective sleeve; said adsorption disk is fixedly connected to said protective sleeve, and said protective sleeve is detachably connected with said wireless charger by said magnetic attraction device.

10. The wireless charging device with a stable connection according to claim 9, wherein said adsorption disk is fixedly connected with said protective sleeve by adhesive connection.

11. The wireless charging device with a stable connection according to claim 9, wherein said wireless charger comprises a charger body which comprises a charging chamber and a power cord; a charging module is arranged in said charging chamber, and said charging module is electrically connected with said power cord.

12. The wireless charging device with a stable connection according to claim 11, wherein said charging chamber comprises said charging end face, which comprises said magnetic attraction part and an upper cover plate; said upper cover plate is fixedly connected to said charging chamber, and said upper cover plate covers said charging module; said magnetic attraction part is arranged on said charging end face, and said magnetic attraction part is arranged on a periphery of said upper cover plate.

13. The wireless charging device with a stable connection according to claim 12, wherein said magnetic attraction part is provided with said at least one magnetic attraction groove, and said magnetic attraction part is provided as a magnet.

14. The wireless charging device with a stable connection according to claim 13, wherein said magnetic attraction part is provided with said at least one magnetic attraction groove, and a depth D of said at least one magnetic attraction groove is 0.5 mm≤D≤2.5 mm.

15. The wireless charging device with a stable connection according to claim 14, wherein a width W of said at least one magnetic attraction slot-groove is 0.5 mm≤W≤2 mm.

16. The wireless charging device with a stable connection according to claim 10, wherein the at least one adsorption protrusion is arranged on said adsorption disk, and said at least one adsorption protrusion is provided as an iron sheet.

17. A method for wirelessly charging an electronic product, comprising:
providing the electronic product and a wireless charging device with a stable connection, wherein said wireless charging device comprises a wireless charging device; and
wherein said wireless charging device comprises a wireless charger and a magnetic attraction device, wherein said wireless charger comprises a charging end face, and said magnetic attraction device comprises a magnetic attraction part and an adsorption disk; said magnetic attraction part is arranged on said charging end face, and said adsorption disk is adsorbed by said magnetic attraction part to form a detachable connection; and
wherein, said magnetic attraction part is provided with at least one magnetic attraction groove, said adsorption disk is provided with at least one adsorption protrusion, and said at least one adsorption protrusion is embedded in said at least one magnetic attraction groove; and
wherein, said adsorption disk is fixedly connected to an electronic product, and said electronic product comprises a protective sleeve; said adsorption disk is fixedly connected to said protective sleeve, and said protective sleeve is detachably connected with said wireless charger by said magnetic attraction device; and
charging the electronic product, wherein the charging step is as follows:
putting said electronic product into said protective sleeve;
fixing said adsorption disk to said protective sleeve; and
adsorbing said electronic product to said wireless charger.

18. The method for wirelessly charging an electronic product according to claim 17, wherein said charging step comprises: fixing said adsorption disk to said electronic product; Adsorbing said electronic product to said wireless charger.

19. The method for wirelessly charging an electronic product according to claim 17, wherein said charging step comprises: fixing said adsorption disk to said electronic product; putting said electronic product into said protective sleeve; and adsorbing said electronic product to said wireless charger.

20. The method for wirelessly charging an electronic product according to claim 17, wherein when said adsorption disk is fixed to said protective sleeve, said adsorption disk should be fixed to a corresponding position of said protective sleeve for charging said electronic product.

* * * * *